United States Patent [19]

Mizote et al.

[11] 4,242,731
[45] Dec. 30, 1980

[54] NAVIGATIONAL INFORMATION INDICATOR FOR SUPPLYING A VEHICLE DRIVER WITH MAKE-TURN INSTRUCTIONS

[75] Inventors: Masanori Mizote, Yokosuka; Kiyoshi Yamaki, Yokohama; Takashi Oka, Tokyo, all of Japan

[73] Assignee: Nissan Motor Company, Limited, Japan

[21] Appl. No.: 6,113

[22] Filed: Jan. 24, 1979

[30] Foreign Application Priority Data

Jan. 25, 1978 [JP] Japan ................................. 53-6826

[51] Int. Cl.³ ............................................. G06F 15/50
[52] U.S. Cl. ..................................... 364/436; 340/24; 340/73; 364/444
[58] Field of Search ............... 364/424, 434, 436, 443, 364/444, 457, 460; 340/52 R, 54, 55, 56, 67, 73, 24

[56] References Cited

U.S. PATENT DOCUMENTS

| | | | |
|---|---|---|---|
| 3,824,534 | 7/1974 | Straumsnes | 340/24 |
| 3,845,289 | 10/1974 | French | 364/436 |
| 3,925,641 | 12/1975 | Kashio | 364/436 |

*Primary Examiner*—Errol A. Krass
*Attorney, Agent, or Firm*—Lowe, King, Price & Becker

[57] ABSTRACT

A navigational information indicator for supplying a vehicle driver with make-turn instructions comprises a first memory for storing each information indicative of each distance travelled by the vehicle as far as a point at which a turn is made, a second memory for storing each information indicative of the direction of each turn, and a display circuit for displaying a directional sign. When the vehicle travels from a first point toward a second point, the distances and directions of turns are respectively stored in the first and second memories in a sequence and these pieces of information are read out in the reverse sequence when the vehicle travels back to the first point from the second point along the same route. The stored information is read out to display each directional sign so as to supply the vehicle driver with make-turn instructions along the return trip.

9 Claims, 4 Drawing Figures

| FIRST SHIFT REGISTER 28 | | | | |
|---|---|---|---|---|
| 1st REGISTER 28-1 | 2nd REGISTER 28-2 | 3rd REGISTER 28-3 | 4th REGISTER 28-4 | 5th REGISTER 28-5 |
| $D_1+D_2+D_3+D_4$ | $D_1+D_2+D_3$ | $D_1+D_2$ | $D_1$ | BLANK |
| SECOND SHIFT REGISTER 30 | | | | |
| 1st REGISTER 30-1 | 2nd REGISTER 30-2 | 3rd REGISTER 30-3 | 4th REGISTER 30-4 | 5th REGISTER 30-5 |
| (0, 1) | (1, 0) | (0, 1) | (1, 0) | BLANK |

NAVIGATIONAL INFORMATION INDICATOR FOR SUPPLYING A VEHICLE DRIVER WITH MAKE-TURN INSTRUCTIONS

FIELD OF THE INVENTION

This invention generally relates to an indicator for a motor vehicle. More particularly, the present invention relates to a navigational information indicator for supplying a driver of a vehicle with make-turn instructions.

BACKGROUND OF THE INVENTION

Motor vehicles are usually equipped with trip meters for indicating the distance travelled by the motor vehicle. Generally conventional type of trip meters are of the mechanical type. In such trip meters a mechanical counter including a numeral display device is driven via reduction gears by a drive shaft operatively connected to the transmission or other mechanism of the vehicle. When the driver of the vehicle intends to measure a distance between two points he or she will drive between, the driver resets the trip meter to zero so that the trip meter will count over the distance travelled, from zero. The trip meter is used not only for merely measuring the travelled distance but also for giving information to the driver along a return trip when the vehicle returns along the same course from the objective point to the original starting point.

When a vehicle driver travels from a starting point to an objective point along an unfamilier course, along which he intends to return to the original starting point, he usually memorizes the distance indicated by the trip meter at an instant when he makes a turn so that he is able to make a turn at the right position when he returns from the objective point toward the original starting point. However, the distance indicated by the trip meter along the return trip does not correspond to the distance that the driver has memorized although the trip meter is reset to zero at the objective point. Therefore, it is usually difficult for the vehicle driver to find the right position at which he should make a turn. When numerous turns are made between the starting point and the objective point, it is almost impossible for the driver to memorize each distance at which each turn is made and directions of respective turns.

SUMMARY OF THE INVENTION

The present invention has been achieved for eliminating the above mentioned inconvenience in a return trip.

It is therefore, an object of the present invention to provide a navigational information indicator for supplying a driver of a vehicle with make-turn instructions in a return trip.

In accordance with the present invention, each distance as far as a point at which a turn is made, is stored in each memory unit, while the direction of the turn is also stored in other memory unit when the vehicle travels along a predetermined course from a starting point to an objective point. In the return trip from the objective point toward the original starting point, the distance travelled from the objective point is measured and before the vehicle reaches a point, at which the vehicle driver is supposed to make a turn in a predetermined direction, i.e. the opposite direction with respect to the direction of the turn he made when coming toward the objective point, the stored direction is indicated in the opposite form so as to instruct the vehicle driver to make a turn at a predetermined point to the indicated direction.

BRIEF DESCRIPTION OF THE DRAWINGS

This and other objects and features of the present invention will become readily apparent from the following detailed description of the preferred embodiment taken in conjunction with the accompanying drawings in which.

DETAILED DESCRIPTION OF THE PREFERRED EMBODIMENT

Figure 1:
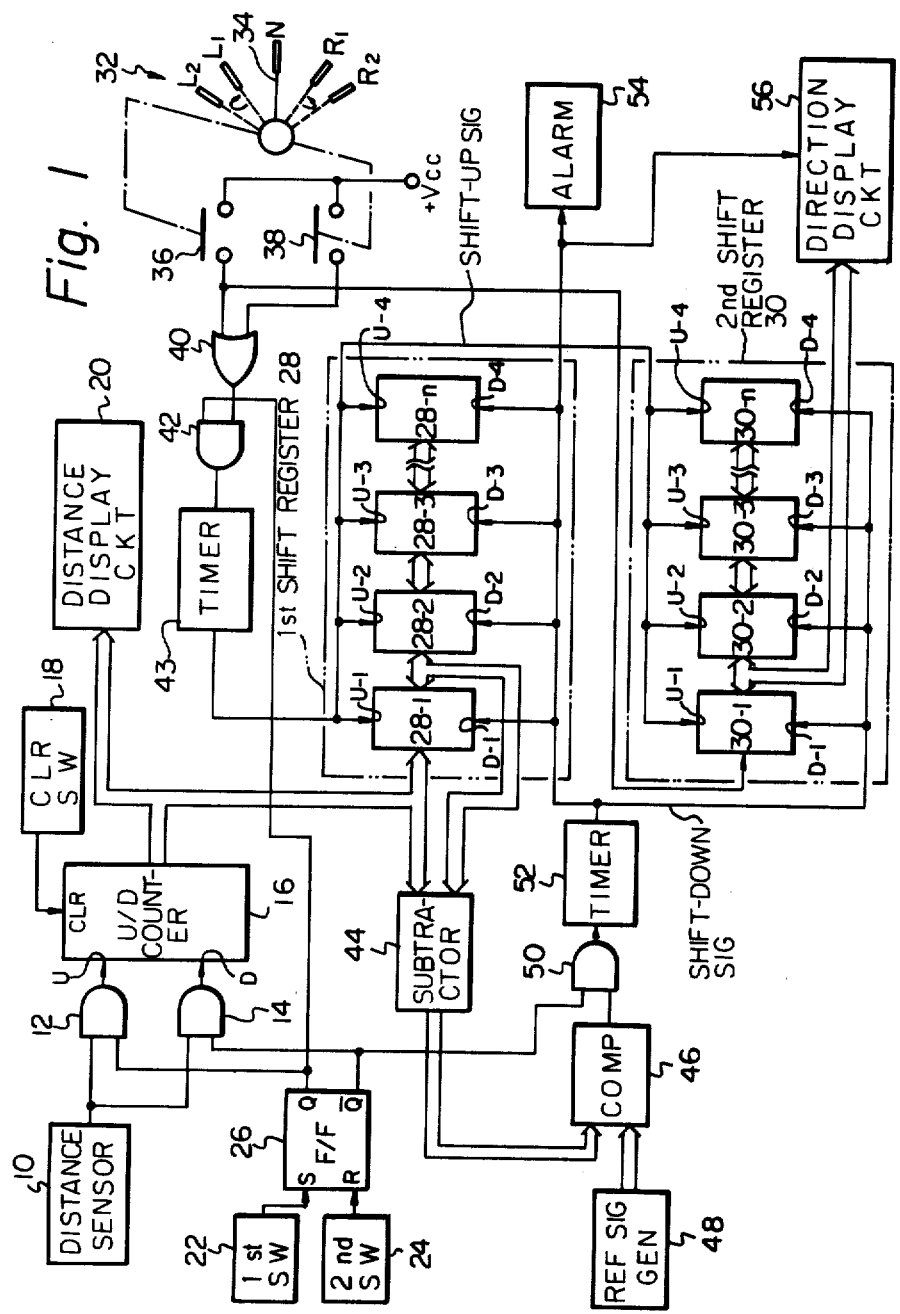
FIG. 1 shows in schematic block diagram form a preferred embodiment of the navigational indicator according to the present invention.

Referring to FIG. 1, a preferred embodiment of a navigational information indicator for supplying a driver of a vehicle with make-turn instructions is shown. A distance sensor 10 is provided for producing a first signal $S_1$ indicative of the distance travelled by the vehicle. The distance sensor 10 actually comprises a pulse generator (not shown) responsive to the rotation of the drive shaft of the vehicle for producing a pulse each time the vehicle travels a predetermined unit distance. The output of the distance sensor 10 is connected to a first input of an AND gate 12 and to a first input of another AND gate 14. The outputs of the AND gates 12 and 14 are respectively connected to a count-up input U and a count-down input D of an up-down counter 16.

First and second switches 22 and 24 are provided for switching the functions of the navigational information indicator. Each of the first and second switches 22 and 24 comprises a manual push-button type switch and is arranged to produce a pulse signal when operated. The output of the first switch 22 is connected to a set terminal S of a flip-flop 26, while the output of the second switch 24 is connected to a reset terminal R of the flip-flop 26. The flip-flop 26 has first and second outputs Q and $\bar{Q}$ which are respectively connected to the second inputs of the AND gates 12 and 14. The up-down counter 16 has a clear terminal CLR which is connected to a clear switch 18. The clear switch 18 comprises a manual push-button type switch and is arranged to produce a pulse signal when operated. The up-down counter 16 is arranged to clear (cancel) all the information stored therein when a pulse signal is applied to the clear terminal CLR. The output of the up-down counter 16 is connected to an input of a distance display circuit 20 which comprises a decoder and a suitable display unit, such as a seven-segment display device, both of which are not shown. The wide directed line between the up-down counter 16 and the distance display circuit 20 means that the connection thereof is actually performed by means of a plurality of wires which transmit a binary coded signal. Similar wide directed lines are shown between other circuits as shown in FIG. 1, and these wide directed lines indicate a plurality of wires in the same manner.

The output of the up-down counter 16 is further connected to a first input of a substractor 44 and to an input of a first register 28-1 included in a first shift register 28. The first shift register 28 includes a plurality of registers 28-1 to 28-n. The plurality of registers 28-1 to 28-n are connected in series where each of the registers 28-1 to 28-n has first and second shift control terminals U-1 and U-n and D-1 to D-n. The output of the first register 28-1 included in the first shift register 28 is connected to the second input of the subtractor 44. The output of the subtractor 44 is connected to a first input of a digital comparator 46 which has a second input connected to an output of a reference signal generator 48. The subtractor 44 produces an output signal indicative of the difference between two values respectively indicated by the two input signals, while the comparator 46 produces an output signal when the values indicated by the two input signals equal to each other. The reference signal generator 48 includes an encoder which produces a binary coded signal indicative of a predetermined distance which is preset.

The output of the digital comparator 46 is connected to an input of an AND gate 50 which has another input connected to the second output $\overline{Q}$ of the flip-flop 26. A second shift register 30 has similar construction as the first shift register 28, wherein the second shift register 30 includes a plurality of registers 30-1 to 30-n. Each of the registers 28-1 to 28-n of the first shift register 28 includes a plurality of flip-flops since each register is directed to store a datum of a distance, while each of the registers 30-1 to 30-n of the second shift register 30 consists of a single flip-flop since each register is directed to store a directional datum. The output of the AND gate 50 is connected to an input of a timer circuit 52, such as a monostable multivibrator, the output of which is connected to all of the second shift control terminals D-1 to D-n of the first and second shift registers 28 and 30. The output of the timer circuit 52 is further connected to a suitable alarm device 54, such as a buzzer or a lamp. The output of the timer circuit 52 is further connected to a control terminal of a direction display circuit 56 which has a decoder or a switching circuit and a display unit for visually displaying turn-right and turn-left signs in the form of arrow heads. The direction display circuit 56 has an input connected to the output of the first register 30-1 included in the second shift register 30.

A reference numeral 32 generally indicates the turn-signal switch which is inherent to a motor vehicle. The turn-signal switch 32 has a lever 34 which will be manually operated by the driver when he or she wishes to issue a turn signal by flashing either right or left turn-signal lamps mounted on the outer surface of the vehicle. The lever 34 is arranged to rotate, when operated, with respect to a pivot (no numeral) in the clockwise and counterclockwise directions as assume the first and second positions $R_1$ and $L_1$ from the neutral position N, and is further arranged to rotate in these two directions, when further depressed, as far as end positions $R_2$ and $L_2$. When the lever 34 is at either one of the end positions $R_2$ and $L_2$, one of first and second relays 36 and 38 is energized to close the contacts thereof. In other words, when the lever 34 assumes the position $L_2$, the first relay 36 becomes ON and thus a predetermined positive voltage supplied at one terminal of the relay from a power supply +Vcc is transmitted to a first input of an OR gate 40. On the other hand, when the lever 34 assumes the other end position $R_2$, the second relay 38 becomes ON and thus the predetermined voltage is applied to the second input of the OR gate 40.

The lever 34 at one of the end positions $R_2$ and $L_2$ automatically returns to respective first and second positions $R_1$ and $L_1$ upon cessation of a biasing force, as indicated by U-shaped directed lines.

The output of the OR gate 40 is connected to a first input of an AND gate 42 which has a second input connected to the first output Q of the flip-flop 26. The output of the AND gate 42 is connected to an input of a timer circuit 43, such as a monostable multivibrator, the output of which is connected to all of the first shift control terminals U-1 to U-n of the first and second shift registers 28 and 30.

Figure 2:
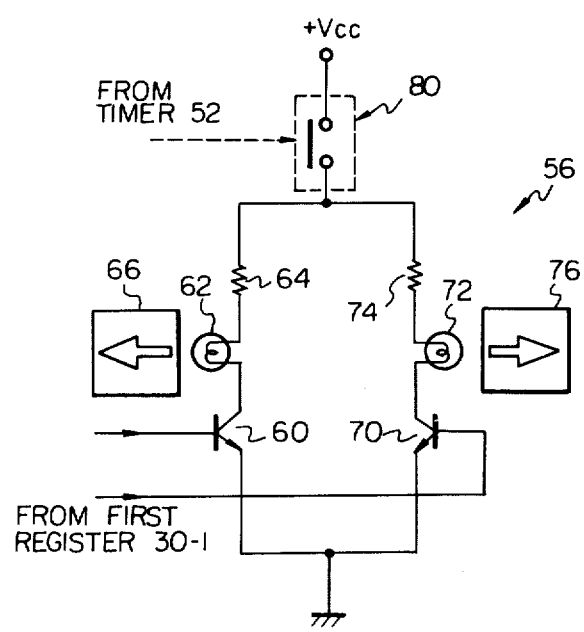
FIG. 2 shows a detailed circuit diagram of the direction display circuit shown in FIG. 1.

Reference is now made to FIG. 2 which shows a detailed circuit diagram of the direction display circuit 56 shown in FIG. 1. The direction display circuit 56 includes first and second transistors 60 and 70 which function as switches, first and second lamps 62 and 72, first and second resistors 64 and 74, first and second plates 66 and 76, and a relay 80. The first and second plates 66 and 76 respectively have arrow head signs which are arranged to be displayed when illuminated. The first and second lamps 62 and 72 are disposed adjacent to the first and second plates 66 and 76 so as to respectively illuminate the plates 66 and 76.

The base electrodes of the first and second transistors 60 and 70 are respectively connected to the outputs of the first register 30-1 included in the second shift register 30. The emitters of the first and second transistors 60 and 70 are connected to ground, while the collectors of the same are respectively connected via first and second lamps 62 and 72 and first and second registors 64 and 74 to one terminal of the relay 80. The other terminal of the relay 80 is connected to the positive power supply +Vcc. The winding (not shown) of the relay 80 is responsive to the output signal of the timer circuit 52 so that the contacts of the relay 80 close when a high level signal is applied from the timer circuit 52.

It will be understood that when a high level signal is applied to the base electrode of the first transistor 60, while a low level signal is applied to the base electrode of the second transistor 70, only the first transistor 60 becomes conductive and thus the first lamp 62 is energized to emit light if the contacts of the relay 80 are closed. When the first lamp 62 emits light, only the first plate 66 is illuminated to visually display the arrow head sign the direction of which is the left. In the same manner, the other arrow head on the second plate 76 is displayed when a high level signal is applied to the base electrode of the second transistor 70 from the first register 30-1.

The navigational information indicator shown in FIG. 1 operates as follows. It is assumed that the vehicle is going to travel along a predetermined course shown in FIG. 3. The course has a starting point S, four points (intersections) P-1 to P-4 at which turns will be made, and an objective point T. Before leaving from the starting point S, the vehicle driver operates the clear switch 18 to reset the information stored in the up-down counter 16 to zero. Further the driver operates the first switch 22 to produce a pulse signal with which the flip-flop 26 is triggered. The flip-flop 26 produces a high level signal at the first output Q, while a low level signal is developed at the second output $\overline{Q}$. The high signal is applied to the first AND gate 12 and thus the first AND gate 12 is enabled to permit the transmission of the pulses from the distance sensor 10 to the count-up input U of the up-down counter 16. The up-down counter 16 counts up the number of pulses from zero to produce an output signal indicative of the distance travelled by the vehicle. In accordance with the value indicated by the output signal of the up-down counter 16 the distance display circuit 20 visually indicates the measured distance.

When the vehicle is approaching to the first point P-1 at which the vehicle is going to make a left turn, the driver operates the turn-signal switch lever 34 before making a turn, depressing the lever 34 all the way to the end position $L_2$. The first relay 36 is energized to close the contacts thereof to transmit the predetermined voltage from the power supply +Vcc via the OR gate 40 to an input of the AND gate 42. Since the AND gate 42 receives a high level signal from the first output Q of the flip-flop 26, a high level signal is fed to the input of the timer 43. The timer 43 includes a monostable multivibrator and produces a pulse signal the width of which is predetermined, in response to a high level signal applied to the input thereof. The output pulse signal of the timer 43 is fed to all of the first shift control terminals U-1 to U-n of the first and second shift registers 28 and 30. Both of the shift registers 28 and 30 are arranged to shift up the data stored in each register 28-1 to 28-n and 30-1 to 30-n in response to the trailing edge of the pulse signal applied from the timer 43. In other words, the trailing edge of the timer output pulse functions as a shift-up command signal.

In response to the shift-up command signal applied to the first register 28, the information indicative of the distance travelled by the vehicle is stored in the first register 28-1. This means that the first distance $D_1$ between the starting point S and the first point P-1 is stored in the first register 28-1. (Actually, the distance indicated by the up-down counter 16 output signal does not correctly equal the distance $D_1$ when the vehicle is in front of the first point P-1, but approximately equal the same.) Meanwhile, the predetermined voltage transmitted via the first relay 36 is applied to the input of the first register 30-1 of the second shift register 30. Therefore, a high level signal is stored in the form of a binary code of (1, 0) in the first register 30-1. This binary code (1, 0) indicates that the direction of the turn is left. The stored code of (1, 0) will be used in a return trip to supply the vehicle driver with directional instructions.

The vehicle makes a turn to the left at the first point P-1 and maintains travelling toward the second point P-2. When a turn at the first point P-1 is completed, the lever 34 of the turn-signal switch 32 automatically returns to the neutral position N. In front of the second point P-2 the output signal of the up-down counter 16 indicates the approximate distance between the starting point S and the second point P-2. This distance is expressed by $D_1+D_2$ and the data indicative of the distance $D_1+D_2$ is stored in the first register 28-1 of the first shift register 28 when the turn signal switch lever 34 is operated. When the shift of the data is performed, the data prestored in the first register 28-1 is shifted up to the second register 28-2. Since the direction of the turn at the second point P-2 is the right, no signal is applied to the input of the first register 30-1 of the first shift register 30. This means a binary code of (0, 1) is stored in the first register 30-1, while the prestored data the binary code of which is (1, 0) in the first register 30-1 is shifted up to the second register 30-2. In the same manner, the distance information and directional information in connection with each point along the travelling course are stored in a sequence in the first and second shift registers 28 and 30. When the vehicle arrives at the objective point T, the turn signal switch lever 34 is not operated to either end position $L_2$ or $R_2$ and therefore, the data stored in the respective registers are not shifted.

Figures 3, 4:
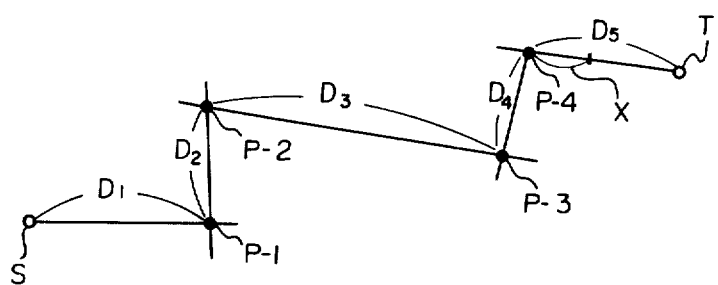
FIG. 3 shows a travelling course for the purpose of the explanation of the operation of the nagivational indicator shown in FIG. 1.
FIG. 4 is a table which shows the relationship between each register and data stored therein.

FIG. 4 is a table which shows the data stored in each registers of the first and second shift registers 28 and 30. It will be seen that the arrangment of the data shown in FIG. 4 will be obtained when the turn signal switch lever 34 is operated at the last (fourth) point P-4. Although there are five legs the distance of which are respectively $D_1$, $D_2$, $D_3$, $D_4$ and $D_5$, along the predetermined course, the total distance between the starting point S and the objective point T is not stored in any of the registers 28-1 to 28-4 of the first register 28. Namely, four distances $D_1$ to $D_1+D_2+D_3+D_4$ as shown in the table of FIG. 4 are stored in the first to fourth registers 28-1 to 28-4. The directional data indicative of the directions of the four turns made at first to fourth points P-1 to P-4 are stored in the first to fourth registers 30-1 to 30-4 of the second shift register 30. Remaining registers in the first and second shift registers 28 and 30 are not filled with data. In other words, fifth to "n"th registers. 28-5 to 28-n and 30-5 to 30-n are blank.

When the vehicle starts from the objective point T toward the original starting point S, the vehicle driver operates the second switch 24. A pulse is fed to the reset terminal R of the flip-flop 26 trigger the same and thus a high level signal is produced at the second output $\overline{Q}$, while a low level signal is present at the first output Q. Therefore, the second AND gate 14 is enabled to transmit the pulse train signal from the distance sensor 10 to the count-down terminal D of the up-down counter 16, while the first AND gate 12 is disabled. The number of the pulses from the distance sensor 10 is counted down from the number of pulses pre-counted by the up-down counter 16. In other words, the up-down counter 16 produces an output signal indicative of a distance which corresponds to the remaining distance to the original starting point S by substracting the distance actually travelled from the objective point T, from the total distance between the starting point S and the objective point T. In response to the output signal of the up-down counter 16, the distance display circuit 20 displays the remaining distance in the form of numerals.

The output signal of the up-down counter 16 is further applied to the subtractor 44. At this time, no shiftup command signal is applied to the shift control terminals U-1 to U-n of the first shift register 28, and thus the output signal of the up-down counter 16 is not stored in registers 28-1 to 28-n, the pre-stored data being respectively held as they are. Meanwhile, the data stored in the first register 28-1 is transmitted to the second input of the subtractor 44 so that the distance indicated by the output signal of the up-down counter 16 is compared with the distance indicated by the data stored in the first register 28-1.

When the vehicle is between the objective point T and the fourth point P-4, the distance indicated by the output signal of the up-down counter 16 is expressed by $D_1+D_2+D_3+D_4+X$, wherein X is the distance between the fourth point P-4 and a point at which the vehicle is. Namely, the subtractor 44 receives two input signals respectively indicative of first and second distances $D_1+D_2+D_3+D_4+X$ and $D_1+D_2+D_3+D_4$. The subtractor 44 produces an output signal, in the form of a binary coded signal, indicative of the difference between the two distances. It will be understood that the distance indicated by the output signal of the subtractor 44 corresponds with the distance X. The information of the distance X is fed to the first input of the digital comparator 46 which receives a reference signal at the second input from the reference signal generator 48. The reference signal generator 48 produces an output signal, in the form of a binary coded signal, indicative of a predetermined distance such as 500 meters. The digital comparator 46 produces an output pulse signal when two distances indicated by the two input signals are equal to each other. In the above case, the digital comparator 46 produces an output signal when the distance X equals 500 meters. The output pulse signal of the digital comparator 46 is transmitted via the AND gate 50 which is enabled by the high level signal from the second output $\overline{Q}$ of the flip-flop 26, to the input of the timer 52. The timer 52 includes a monostable multivibrator which produces a pulse signal the width of which is predetermined. The output pulse signal of the timer 52 is applied to the alarm 54 and to the direction display circuit 56. Therefore, the alarm 54 issues an alarm signal, such as buzz, while the direction display circuit 56 is enabled to display a directional sign, such as an arrow head sign on the plate 66 or 76 shown in FIG. 2, in accordance with an input signal thereof. Since the data stored in the first register 30-1 of the second shift register 30 is transmitted to the direction display circuit 56, the direction of the directional sign to be displayed is determined by the data stored in the first register 30-1. Let us remember that a right turn was made at the fourth point P-4 when the vehicle was travelling toward the objective point T, and therefore a left turn should be made at the same point P-4 in the return trip. The data stored in the first register 30-1 are expressed in terms of (0, 1) as shown in FIG. 4, and accordingly low and high level signals are respectively supplied to the bases of the transistors 70 and 60 shown in FIG. 2. Consequently, the first lamp 62 is energized to illuminate the first plate 66 which includes an arrow head of a left direction.

The alarm 54 issues an alarm signal to draw the attention of the vehicle driver, for a predetermined period of time defined by the pulse width of the pulse signal from the timer 52. In the same manner the direction display circuit 56 displays a directional sign for the same period of time. At the end of this predetermined period of time respective data stored in the registers 28-1 to 28-n and 30-1 to 30-n of the first and second shift registers 28 and 30 are shifted down in response to the trailing edge of the pulse from the timer 52. It will be seen that the date stored in the first registers 28-1 and 30-1 are respectively substituted with the data which have been stored in the second registers 28-2 and 30-2.

The vehicle makes a left turn in accordance with the directional instructions given by the direction display circuit 56 at the fourth point P-4 and keeps travelling toward the third point P-3. The distance remaining to the original starting point S indicated by the output signal of the up-down counter 16 is then compared with the second data, i.e. the distance between the third point P-3 and the starting point S, which distance is expressed by $D_1+D_2+D_3$. The digital comparator 46 produces an output pulse signal when the vehicle is 500 meters ahead of the third point P-3 and thus the alarm 54 issues an alarm signal, while the direction display circuit 56 displays directional instructions in the same manner as in the case of the fourth point P-4. The following directional instructions will be displayed in front of each of remaining points. It will be understood that the distance information stored in the first shift register 28 is read out in the reverse sequence with respect to which it was stored, and the directional information stored in the second shift register 30 is read out in the reverse sequence with respect to which it was stored.

Although in the above operation it is described that the distance indicated by the output signal of the reference signal generator 48 corresponds to 500 meters, the value of the reference distance may be changed, if desired. As described hereinabove, the reference signal generator 48 includes an encoder via which a predetermined distance is preset. A suitable keyboard may be connected to the encoder so that the value of the reference distance to be preset may be selected at will. When the vehicle is driven in urban areas where the distance between intersections is relatively short, it is preferable to set the reference distance (within) at a relatively small value, such as 50 meters, so that the directional instructions are not visually displayed so early that the driver may make a turn at an intersection before the correct intended intersection.

As described hereinabove, the directional instructions are given to the vehicle driver in the form of an arrow head sign which is visually displayed in this embodiment. However, the directional information (intstruction) may be given to the vehicle driver in the form of an audible sound or an illumination of a lamp. Two different tones of an audible sound may supply the vehicle drive with first and second instructions corresponding to two directions of a turn to be made. Further two different frequencies of flashing of a lamp may give the vehicle driver different instructions. When a buzzer or lamp is used as a directional indicator, the alarm 54 shown in FIG. 1 may be omitted.

Although in the embodiment, it is described that the navigational information indicator is used for supplying the vehicle driver with directional instructions only in a return trip, if the information stored in the first and second shift registers 28 and 30 is read out in the same sequence as it was stored, the navigational information indicator may supply the vehicle driver with directional information when the vehicle is driven again along the same course from the starting point S to the objective point T.

Further, when it is desired to use the stored information repeatedly, both of the shift registers 28 and 30 may be respectively formed in a circulation type. For instance, the output of the last register such as the register 28-n or 30-n is connected to the input of the first register 28-1 or 30-1 so that none of the data is cancelled and the stored information is repeatedly read out as many times as desired so as to supply the vehicle driver with directional instructions each time the vehicle is driven along the same course.

As described in connection with the operation, the shift-up command signal is produced in response to the operation of the turn-signal switch 32 in the preferred embodiment. However, the shift-up command signal may be produced by a suitable switch if desired. If an independent switch is provided for producing a shift-up command signal, it is prevented to erroneously write distance and/or directional information into the first and second shift registers 28 and 30 when the lever 34 is misoperated when not intended.

The navigational information indicator according to the present invention is described hereinabove in connection with FIG. 1 which shows an embodiment thereof wherein the navigational information indicator includes a plurality of discrete circuits or elements. However, if desired, these discrete circuits and elements which form the heart of the navigational information indicator may be substituted with a microcomputer. It will be understood that many modifications and variations of the navigational information indicator may be made without departing from the spirit of the invention.

What is claimed is:

1. A navigational information indicator for supplying a vehicle driver with make-turn instructions, comprising:
   (a) first means for producing a first signal indicative of the distance travelled by said vehicle from a starting point when the vehicle is driven from said starting point toward an objective point, and a second signal indicative of the distance remaining to said starting point when the vehicle is driven back from said objective point toward said starting point;
   (b) second means for producing a third signal indicative of the direction of each turn of said vehicle, said second means comprising a turn signal switch including a pivotable lever, said lever being manually pivotable selectively in clockwise and counterclockwise directions from a neutral position to respectively assume first and second positions for producing right and left turn signals, said lever being further pivotable by manual force selectively in said clockwise and counterclockwise directions beyond said first and second positions to respectively assume third and fourth positions, and switching means operated by said lever to (1) produce a first turn signal indicative of a right turn, as said third signal, when said lever assumes said third position, and (2) produce a second turn signal indicative of a left turn, as said third signal, when said lever assumes said fourth position, said lever automatically returning to said first and second positions respectively from said third and fourth positions when the manual force is removed;
   (c) third means for sequentially storing information indicated by said first signal during turning;
   (d) fourth means for sequentially storing information indicated by said third signal during turning;
   (e) fifth means for controlling the storing function of said third and fourth means, said fifth means including said switching means which produces one of said turn signals when said lever of said turn signal switch assumes either one of said third and fourth positions;
   (f) sixth means responsive to information read out from said third means in the reverse sequence with respect to which it was stored and to said second signal indicative of the remaining distance, said sixth means producing a fourth signal which triggers said fourth means to read out a piece of information from said fourth means in the reverse sequence with respect to which it was stored when the remaining distance has a predetermined relationship with respect to a distance indicated by said read out information; and
   (g) seventh means for visually displaying a navigational sign in accordance with the information read out from said fourth means.

2. A navigational information indicator as claimed in claim 1, wherein said first means comprises
   (a) a distance sensor for producing a pulse signal each time said vehicle travels over a predetermined unit distance;
   (b) an up-down counter for either counting up or counting down the number of pulses applied from said distance sensor;
   (c) first and second gate means for selectively supplying said pulse signal to the count-up or count-down terminal of said up-down counter when enabled; and
   (d) switching means for selectively enabling one of said first and second gate means;

3. A navigational information indicator as claimed in claim 2, further comprising means for clearing the information stored in said up-down counter.

4. A navigational information indicator as claimed in claim 1, wherein said third and fourth means respectively comprises shift registers.

5. A navigational information indicator as claimed in claim 1, wherein said sixth means comprises;
   (a) a subtractor responsive to said first signal and said information read out from said third means;
   (b) a reference signal generator for producing a signal indicative of a predetermined distance; and
   (c) a comparator responsive to the output signal of said subtractor and said reference signal for producing an output signal when the distances indicated by the two signals equal to each other.

6. A navigational information indicator as claimed in claim 1, wherein said seventh means comprises:
   (a) first and second switches responsive to said information read out from said fourth means, said first and second switches alternatively turning ON and OFF in accordance with said information;
   (b) first and second lamps connected to said first and second switches respectively; and
   (c) first and second directional signs arranged to be illuminated by said first and second lamps respectively, for respectively indicating first and second directions.

7. A navigational information indicator as claimed in claim 1, further comprising timer means responsive to said fourth signal from said sixth means, said timer means causing said seventh means to display said navigational sign for a predetermined period of time.

8. A navigational information indicator as claimed in claim 1, further comprising an alarm device responsive to said fourth signal from said sixth means.

9. A navigational information indicator as claimed in claim 1, further comprising a distance display circuit responsive to said first signal from said first means.

* * * * *